United States Patent [19]

Mücke et al.

[11] 4,273,894

[45] Jun. 16, 1981

[54] THERMOPLASTIC COMPOSITION COMPRISING CHLORINATED POLYOLEFIN AND ACRYLATE POLYMER

[75] Inventors: Rainer Mücke, Burgkirchen; Johann Schiller, Neuötting; Herbert Säckl, Unterau, all of Fed. Rep. of Germany

[73] Assignee: Hoechst Aktiengesellschaft, Fed. Rep. of Germany

[21] Appl. No.: 170,881

[22] Filed: Jul. 21, 1980

[30] Foreign Application Priority Data

Jul. 24, 1979 [DE] Fed. Rep. of Germany ....... 2929959

[51] Int. Cl.³ .................... C08L 23/28; C08L 33/08; C08L 33/10
[52] U.S. Cl. .................................. 525/228; 128/275; 260/23 AR; 260/28.5 D; 525/227; 525/192
[58] Field of Search ................. 525/227, 192, 84, 228

[56] References Cited

U.S. PATENT DOCUMENTS

| | | | |
|---|---|---|---|
| 3,646,163 | 2/1972 | Taima et al. | 525/227 |
| 3,814,740 | 6/1974 | Miller | 260/86.1 E |

FOREIGN PATENT DOCUMENTS 7733140  10/1977  Fed. Rep. of Germany .

*Primary Examiner*—Carman J. Seccuro
*Attorney, Agent, or Firm*—Connolly and Hutz

[57] ABSTRACT

Thermoplastic composition for the manufacture of transparent and flexible articles, such as containers, bags and flexible tubes, coming into contact with parenteral liquids essentially consists of 60 to 95% by weight of at least one chlorinated polyolefin and 5 to 40% by weight of at least one copolymer of butadiene, styrene and an acrylic acid or a methacrylic acid ester.

10 Claims, No Drawings

THERMOPLASTIC COMPOSITION COMPRISING CHLORINATED POLYOLEFIN AND ACRYLATE POLYMER

This invention relates to a thermoplastic composition which is especially suitable for the manufacture of transparent and flexible articles coming into contact with parenteral liquids.

It is known to use molding compositions of plasticizer-containing polyvinyl chloride (PVC) for the manufacture of transparent and flexible articles such as containers, bags and tubes for parenteral liquids, for example blood, blood substitutes, infusion solutions, medicinal solutions and other physiological liquids.

These molding compositions of plasticized PVC have the advantage that the articles made therefrom have a relatively high strength, are transparent, they are stable to sterilization even at higher temperatures and can be readily welded by high frequency.

Their drawback is the plasticizer migration, even with the use of polymeric plasticizers, due to hydrolysis at sterilization temperature of 120° C. and the relatively high water vapor permeability which results in evaporation losses, for example when aqueous liquids are stored for a prolonged period of time in containers made of such a material.

German Utility Model No. 7,733,140 describes medical apparatus for parenteral liquids made from a thermoplastic composition consisting of 50 to 95 parts by weight of chlorinated polyolefin and 5 to 50 parts by weight of polymers of acrylic and/or methacrylic acid esters.

The articles made from these molding compositions are characterized by a low water vapor permeability, good welding properties, high strength and flexibility and they do not contain noticeable amounts of substances capable of being extracted or hydrolyzed. They do not have, however, the desired transparency. Moreover, it has been found that the articles may get turbid during sterilization, which phenomenon disappears partially only after prolonged storage. In addition, processability of the known thermoplastic compositions, especially by calendering and extrusion, is not satisfactory.

It is the object of the present invention to provide a thermoplastic composition which does not have the aforesaid disadvantages and which is characterized especially by a low water vapor permeability, good welding properties, high strength and flexibility, is substantially free from hydrolizable and extractable components and, in addition, has a high transparency which is not lost at elevated temperature combined with good processing properties on the conventional processing machines for thermoplastic compositions such as extruders and calenders.

The thermoplastic composition according to the invention substantially consists of
(a) 60 to 95% by weight of at least one chlorinated polyolefin and
(b) 5 to 40% by weight of at least one copolymer of butadiene, styrene and an acrylic acid or a methacrylic acid ester,
the percentages by weight being calculated on the sum of the weights of polyolefin(s) and copolymer(s).

The composition according to the invention preferably consists essentially of
(a) 75 to 90% by weight of at least one chlorinated polyolefin and
(b) 10 to 25% by weight of at least one copolymer of butadiene, styrene and an acrylic acid or methacrylic acid ester.

Suitable chlorinated polyolefins are chlorination products of polyolefins, preferably polyethylene, polypropylene and copolymers of ethylene and propylene, more preferably chlorinated high density polyethylene.

The chlorine content of the chlorinated polyolefins to be used is expediently in the range from 20 to 45, preferably from 25 to 40%, by weight. They have a mean molecular weight perferably in the range of from 30,000 to 300,000, more preferably from 40,000 to 100,000, calculated from the chlorine content and the molecular weight of the starting polyethylene determined by gel chromatography (cf. WeBlau, Makromolekulare Chemie, volume 26, pages 96 to 101, (1958)).

As copolymers of butadiene, styrene and an acrylic acid or a methacrylic acid ester there are preferably used those consisting of 30 to 60, preferably 35 to 45%, by weight of butadiene, 20 to 40, preferably 25 to 35% by weight of styrene and 15 to 40, preferably 17 to 25% by weight of the ester of acrylic acid or methacrylic acid (the percentages by weight being related to the copolymer).

In general, the esters of acrylic acid and methacrylic acid contain as alcohol moiety a saturated aliphatic, linear or branched alcohol having from 1 to 6 and preferably 1 to 4 carbon atoms. Suitable esters are, for example, methyl acrylate, ethyl acrylate, isopropyl acrylate, butyl acrylate, hexyl acrylate, and the corresponding methacrylates, the esters of methacrylic acid being preferred. Especially good results are obtained with methyl-methacrylate.

The copolymers of butadiene, styrene and an ester of acrylic acid or methacrylic acid to be used according to the invention may contain small amounts of further monomers, preferably acrylonitrile or methacrylonitrile, preferably from 1 to 7% by weight thereof, calculated on the copolymer.

The chlorinated polyolefins and copolymers are known and available on the market.

In order to facilitate processing of the thermoplastic compositions of the invention, for example on calenders and extruders, they may be blended with processing aids, heat stabilizers, lubricants and other suitable additives. Light stabilizers, antistatic agents and optionally pigments may also be added.

As processing aid poly(methyl-methacrylate) is preferably added in an amount of up to about 10% by weight, preferably from 0.5 to 5% by weight, calculated on chlorinated polyolefin. Poly(methyl-methacrylates) having a relative viscosity of 0.5 to 7, preferably 1 to 3, measured with 1% by weight solution in chloroform in an Ubbelohde viscosimeter with the capillary Oa, are preferred. To improve the antiblocking properties a polyolefin is preferably used, which can be the same polyolefin as used for the manufacture of the chlorinated polyolefin or another polyolefin. Polyethylene, polypropylene, copolymers of ethylene and propylene or mixtures of the said polymers are preferred. They are used in an amount of up to about 10% by weight, preferably 0.5 to 5% by weight, calculated on the chlorinated polyolefin.

Suitable heat stabilizers, which are also physiologically acceptable, are, for example, fatty acid salts of calcium, magnesium, aluminium and zinc, organic phosphites, aliphatic epoxides, epoxidized soybean oil, polyhydric alcohols, urea and phenyl urea, optionally together with phenolic antioxidants. The stabilizers are generally added in an amount of from 0.1 to 3% by weight, calculated on chlorinated polyolefin.

Examples of lubricants, that are also physiologically acceptable, are montanic acid esters (montan wax), low molecular weight polyethylene wax and amide wax. Usually, the lubricants are added in an amount of from 0.1 to 2% by weight, calculated on chlorinated polyolefin.

The thermoplastic composition according to the invention is produced by simply mixing the individual components, for example in a rapid mixer as used in plastics processing.

The thermoplastic composition of the invention can be processed on the usual processing machines, preferably sheets are manufactured on calenders or sheets and flexible tubes are manufactured on extruders. From the sheets, which generally have a thickness of 50 to 1,000 μm, preferably 200 to 600 μm, the desired articles, such as beakers, containers, bags and the like, can be manufactured on the usual machines.

The thermoplastic composition according to the invention is characterized by various advantages. In the first place, it can be processed on calenders and extruders without any difficulty and with high throughput. The shaped articles obtained, preferably sheets and flexible tubes, are fully satisfactory in the desired respects. They have a high transparency which does not disappear even at high sterilization temperatures.

The following examples illustrate the invention.

EXAMPLE 1

In a rapid mixer are blended 80 parts by weight of a chlorinated polyethylene (CPE) having a chlorine content of 39% by weight, 20 parts by weight of a methyl-methacrylate-butadiene-styrene (MBS) copolymer consisting of 33% by weight of methyl-methacrylate, 36% by weight of butadiene and 31% by weight of styrene, 1% by weight, related to chlorinated polyethylene, of calcium-zinc stearate and 1% by weight, related to chlorinated polyethylene, of epoxidized soybean oil. On a four-roll calender the composition is calendered at 190° to 210° C. to a 400 μm thick sheet of high transparency (scattering only 11%).

EXAMPLES 2 to 4

Example 1 is repeated with the same chlorinated polyethylene and 5, 10 and 30 parts by weight, respectively, of MBS copolymer. In each case the sum of chloropolyethylene and MBS copolymer is 100 parts by weight.

The sheets obtained become stiffer with increasing MBS proportion, with diminishing MBS proportion the tendency to blocking of the sheets increases. A sheet having a very good flexibility and a low tendency to blocking is obtained with a MBS proportion of 20 parts by weight (Example 1).

EXAMPLE 5

Example 1 is repeated with the exception that the CPE of a chlorine content of 39% by weight is replaced by a CPE having a chlorine content of 34% by weight. The sheets produced with this blend have a slightly higher oxygen permeability with otherwise identical properties.

EXAMPLE 6

Example 1 is repeated using additionally 9% by weight, calculated on chlorinated polyethylene, of poly(methyl-methacrylate) (as processing acid) having a relative viscosity of 1.3, measured with a 1% by weight solution in chloroform in an Ubbelohde viscosimeter with the capillary Oa, and 6% by weight, related to chlorinated polyethylene, of a starting polyethylene as used for the manufacture of CPE to reduce further the tendency to blocking.

The sheet obtained has a high transparency and can be produced at high calender speed.

COMPARATIVE EXAMPLE 1

A sheet having a thickness of 400 μm is calendered from plasticized PVC according to the state of the art and consisting of 70% by weight of polyvinyl chloride and 30% by weight of dioctyl phthalate.

COMPARATIVE EXAMPLE 2

A sheet having a thickness of 400 μm is calendered from a graft polymer consisting of 81 parts by weight of CPE having a chlorine contant of 40% by weight and 19 parts by weight of methyl-methacrylate.

The processing properties of the graft polymer are by far inferior to those of the composition according to the invention. Blood bags of this material do not fully recover their transparency after sterilization in an autoclave, contrary to blood bags made from the composition of the invention.

COMPARATIVE EXAMPLE 3

A sheet having a thickness of 400 μm is calendered from a blend of 80 parts by weight of CPE and 20 parts by weight of poly(methyl-methacylate) (molecular weight 100,000, refractive index $n_{20}$ 1.492). Contrary to the sheets made from the composition according to the invention, this sheet has a milky appearance.

The sheets of Example 1 and comparative Example 1 are sterilized at 120° C. in an autoclave and the aqueous extract is examined under the conditions of DIN 58,361/4 (blood bag test).

The result is summarized in Table I. It can be seen that with sheets made from the composition of the invention the values obtained are in all tests well away from the admissible maximum values.

In Table II are listed all properties of the sheets of Examples 1 to 6 according to the invention and comparative Examples 1 to 3 according to the state of the art that are important for medical apparatus coming into contact with parenteral liquids.

TABLE I

| Blood bag test DIN 58,361/4 | highest admissible values | Example 1 | Comparative Example 1 |
| --- | --- | --- | --- |
| appearance of test solution | clear, colorless | clear, colorless | clear, colorless |
| shifting of pH | ≦10 ml 0,01 n-HCl | 0.0 ml | 0,0 ml |
| consumption for titration of 250 ml | ≦10 ml 0,01 n-NaOH | 0.0 ml | 3 to 5 ml |
| evaporation residue per 250 ml | ≦12.5 mg | 2.1 mg | 3 to 10 mg |
| UV adsorption in the range of | ≦0.2 | at 230 nm | at 230 nm |

TABLE I-continued

| Blood bag test DIN 58,361/4 | highest admissible values | Example 1 | Comparative Example 1 |
|---|---|---|---|
| from 230 to 360 nm | | 0.1 | 0.1 bis 0.25 |
| chlorine ions per 250 ml | ≦1.0 mg Cl' | trace | trace |
| sulfate ions per 250 ml | ≦2.5 mg SO$_4$" | not detectable | not detectable |
| ammonium ions per 250 ml | ≦0.5 mg NH$_4^+$ | trace | trace |
| foam formation | not detectable | not detectable | not detectable |
| oxidizing substances consumption of 0.01 N KMnO$_4$ solution per 250 ml | ≦25.0 ml | 4.1 ml | 10 bis 20 ml |
| heavy metals per 250 ml | ≦0.5 mq Pb$^{++}$ | not detectable | not detectable |

TABLE II

| | tensile strength long./transv. N/mm$^2$ (DIN 53455) | elongation at break long./transv. % (DIN 53455) | turbidity % | scattering % (ASTM D 1003) | turbidity after 10 day storage % | water vapor permeability g/m$^2$ 24 h (DIN 53122) | oxygen permeability cm$^3$/m$^2$ 24 h (DIN 53380) |
|---|---|---|---|---|---|---|---|
| Example | | | | | | | |
| 1 | 11/12 | 431/425 | 16 | 11 | 21 | 3.0 | 79 |
| 2 | 10/10 | 556/604 | 28 | 15 | 43 | 2.3 | 76 |
| 3 | 11/10 | 493/513 | 26 | 14 | 25 | 4.0 | 123 |
| 4 | 14/14 | 314/369 | 22 | 13 | 24 | 4.2 | 128 |
| 5 | 25/10 | 513/610 | 42 | 13 | 25 | 5.2 | 299 |
| 6 | 14/14 | 358/461 | 22 | 10 | 22 | 4.0 | 138 |
| Comparative Example | | | | | | | |
| 1 | 23/20 | 310/315 | 11 | 10 | 14 | 6.9 | 324 |
| 2 | 11/16 | 299/312 | 35 | 15 | 42 | 1.4 | 68 |
| 3 | 12/16 | 287/321 | 85 | 55 | 55 | 1.4 | 76 |

What is claimed is:

1. Thermoplastic composition essentially consisting of
   (a) 60 to 95% by weight of at least one chlorinated polyolefin and
   (b) 5 to 40% by weight of at least one copolymer of butadiene, styrene and an ester of acrylic acid or methacrylic acid.

2. Thermoplastic composition as claimed in claim 1, essentially consisting of 75 to 90% by weight of component (a) and 10 to 25% by weight of component (b).

3. Thermoplastic composition as claimed in claim 1, wherein the chlorinated polyolefin is chlorinated polyethylene, chlorinated polypropylene or a chlorinated copolymer of ethylene and propylene having a mean molecular weight of 30,000 to 300,000 and a chlorine contant of from 20 to 45% by weight and the copolymer consists of 30 to 60% by weight of butadiene, 20 to 40% by weight of styrene and 15 to 40% by weight of the ester of acrylic acid or methacrylic acid.

4. Thermoplastic composition as claimed in claim 3, wherein the chlorinated polyolefin has a mean molecular weight of 40,000 to 100,000 and a chlorine content of 25 to 40% by weight and the copolymer consists of 35 to 45% by weight of butadiene, 25 to 35% by weight of styrene and 17 to 25% by weight of the ester of acrylic acid or methacrylic acid.

5. Thermoplastic composition as claimed in claim 4, wherein the alcohol moiety of the ester of acrylic acid or methacrylic acid is a saturated aliphatic, linear or branched alcohol having 1 to 6 carbon atoms.

6. Thermoplastic composition as claimed in claim 4, wherein the ester is methyl-methacrylate.

7. Thermoplastic composition as claimed in claim 1, containing additionally
   (c) from 0 to about 10% by weight, calculated on chlorinated polyolefin, of poly(methyl-methacrylate) and
   (d) from 0 to about 10% by weight, calculated on chlorinated polyolefin, of polyethylene, polypropylene, a copolymer of ethylene and propylene or a mixture of said polymers.

8. Thermoplastic composition as claimed in claim 7, containing additionally effective amounts of physiologically acceptable stabilizers and lubricants.

9. Process for the manufacture of acrticles and apparatus coming into contact with parenteral liquids, which comprises using a thermoplastic composition as claimed in any one of claims 1 to 8.

10. Articles and apparatus coming into contact with parenteral liquids, especially bags and flexible tubes, made from a thermoplastic composition as claimed in any one of claims 1 to 8.

* * * * *